Aug. 16, 1955     L. C. SMALL, JR     2,715,508
ENGINE MOUNT

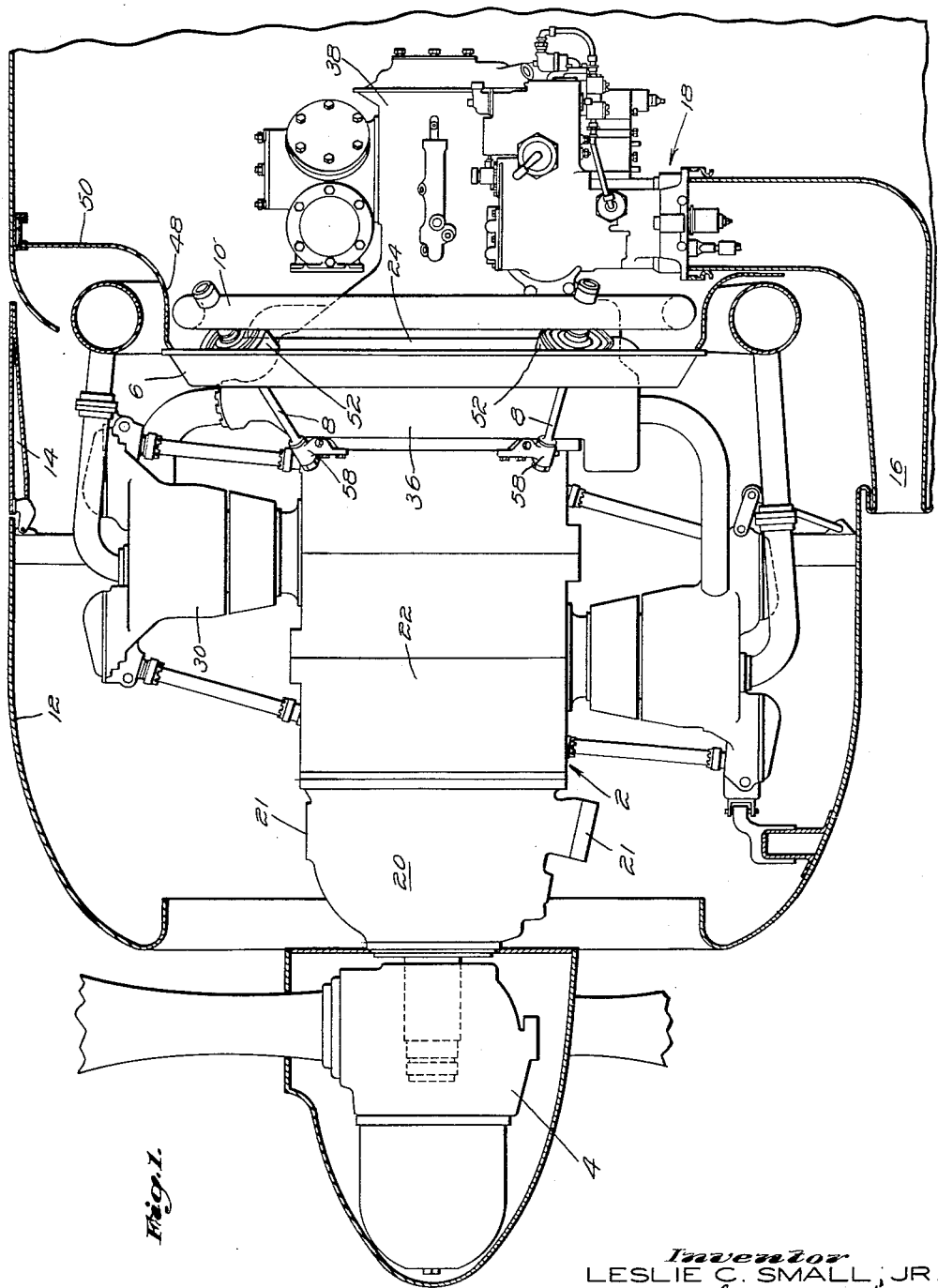

Original Filed Jan. 28, 1949     3 Sheets-Sheet 2

Inventor
LESLIE C. SMALL, JR.
by Charles A. Warren
Attorney

Aug. 16, 1955 — L. C. SMALL, JR — 2,715,508
ENGINE MOUNT

Original Filed Jan. 28, 1949 — 3 Sheets-Sheet 3

Inventor
LESLIE C. SMALL, JR.
by Charles A. Warren
Attorney

United States Patent Office 2,715,508
Patented Aug. 16, 1955

2,715,508

ENGINE MOUNT

Leslie C. Small, Jr., South Glastonbury, Conn., assignor to United Aircraft Corporation, East Hartford, Conn., a corporation of Delaware Original application January 28, 1949, Serial No. 73,404. Divided and this application October 11, 1951, Serial No. 250,910

11 Claims. (Cl. 248—5)

This invention is a division of application Serial No. 73,404, filed January 28, 1949 to John S. Hasbrouck et al, now Patent No. 2,630,105 and relates to improvements in engine suspension means and has particular reference to a resilient mount which, while not limited thereto, is particularly adapted to the mounting of engines in aircraft.

An object is to provide improved means for flexibly mounting an aircraft engine on an aircraft carried engine support including a diaphragm which will support the engine in torque.

A further object is to provide a mount having a mounting diaphragm which may be used not only for mounting but also for a fire seal.

Another object is to provide means for mounting an aircraft engine including a diaphragm which will relieve the blower case of tension and compression mount loads.

Other objects and advantages will be apparent from the specification and claims, and from the accompanying drawings which illustrate an embodiment of the invention.

Fig. 1 is a side elevation of the engine installed in an aircraft.

Figure 3:
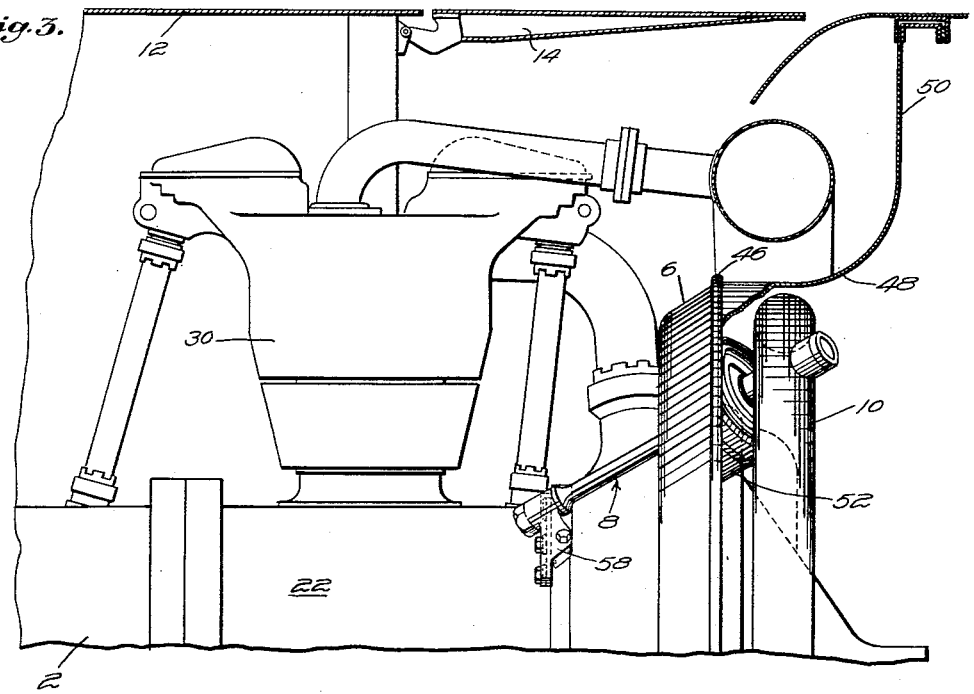
Fig. 3 is a fragmentary side elevation on a somewhat larger scale showing a part of the engine mount structure.

Referring first to Fig. 1, a two-row air-cooled radial aircraft engine 2 drives a propeller system 4 mounted thereon. The engine is connected by a mounting diaphragm 6 and engine mounts 8 to a supporting ring 10 on the airplane. The engine is enclosed within a nacelle 12 which may have conventional cowl flaps 14. Air enters the nacelle through an inlet 16 to carburetor 18.

Engine 2 consists of three main sections, the nose section 20, the power section 22 and the rear section 24. The nose section 20 contains the reduction gear assembly (not shown) for the propeller system 4 and has provisions for the mounting of various accessories or devices on bosses 21 on its exterior. Power section 22 includes the crankcase and the cylinders 30 externally of said crankcase. The rear section 24 consists of the blower case 36 and the rear case 38.

Figure 2:
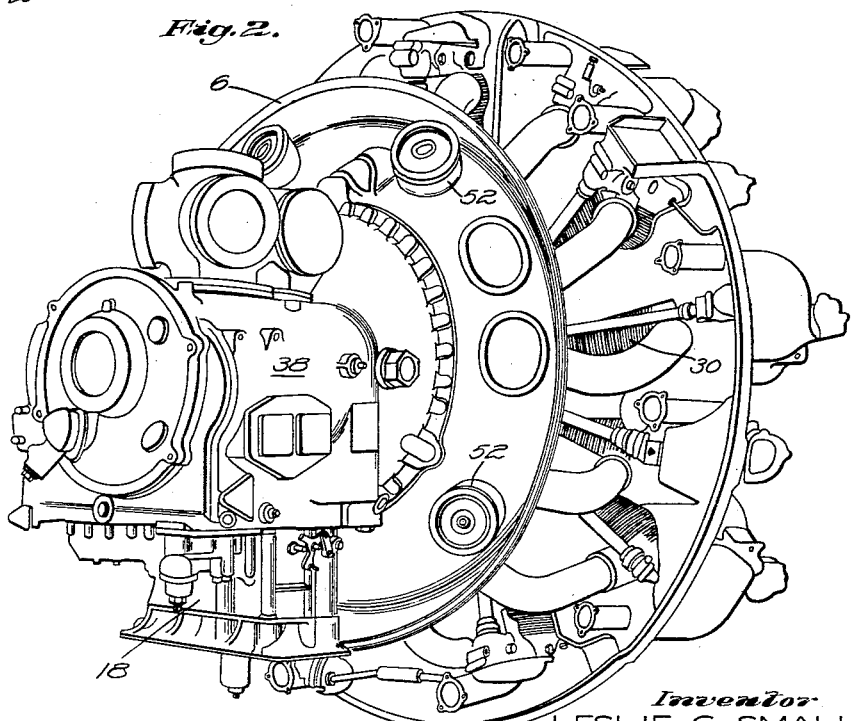
Fig. 2 is a perspective view of the engine from the rear.

Engine 2 is connected to supporting ring 10 by the diaphragm 6 and four engine mounts 8. One of the mounts 8 is shown in detail in Fig. 4 and in a mounted positon in Figs. 1, 2 and 3.

The circular diaphragm 6 is fixedly mounted on the engine 2 between the blower case 36 and the rear case 38. Four bushings 40 which receive the engine mounts 8 are retained therein by a retaining ring 42 and rivets 44. The outer rim 46 of the diaphragm engages a conical flange 48 on the firewall 50 in the nacelle 12 to form a continuation of the wall. This sealing engagement may be made in any desired manner.

Figure 4:
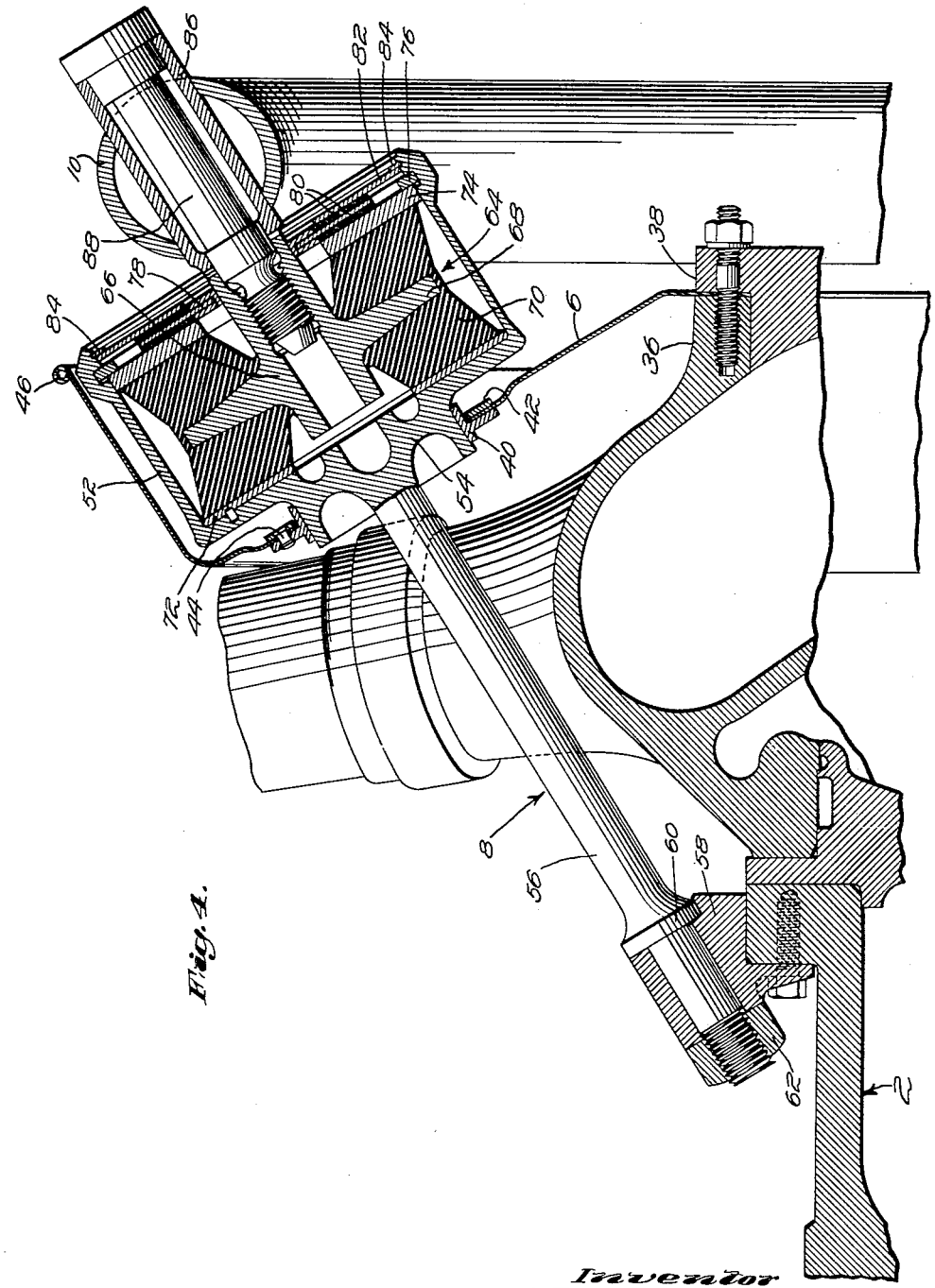
Fig. 4 is an enlarged sectional view through one of the engine mounts and showing its relation to the diaphragm.

Referring first to Fig. 4, each mount unit includes a core housing 52 with a hub 54 fitting in the bushing 40. This housing 52 has integral therewith a rigid, forwardly extending strut 56 fastened at its lower end to a bracket 58, Fig. 3, bolted to the engine crankcase. The strut 56 may have a flange 60 engaging one side of the bracket 58 and held thereon by a clamping nut 62.

A flexible core 64 in housing 52 consists of a metal ring 66 have a flange 68 extending therefrom surrounded by a rubber core 70 bonded thereto. Rubber core 70 has a metal plate 72 bonded to the bottom and a similar metal plate 74 bonded to the top. When assembled, flexible core 64 is within its housing 52, and top plate 74, having a centrally located opening, is fixed to said housing to retain said flexible core by snap ring 76.

On some engines, the core housing 52 of the mount unit is attached to the engine by means of bosses cast integral with the blower case 36. These bosses usually appear above the hollow shell of the air passage of the blower case, this arrangement causes the loads to be applied locally placing high stresses in the blower case. The diaphragm arrangement, however, relieves the blower case of the tension and compression mount loads by allowing them to be transmitted through the forwardly extending mount struts 56 directly to the crankcase; the struts being able to slide axially through the bushings 40 in the diaphragm. The diaphragm 6 supports the engine in torque. It transmits these torque loads to the blower case but distributes them equally because it is clamped between the blower case and crankcase.

Improved frictional damping means are associated with each mount acting in parallel with the shear action of the rubber core 70. This means comprises a metal plate 78 having frictional material 80 on opposite faces thereof in a position to engage the outer surface of top plate 74 and the inner surface of a Belleville spring 82 stressed into a flattened condition to urge the parts constantly into frictional engagement. Spring 82 is held in place by a snap ring 84.

The ring 10 is provided at each engine mount unit location with a stud receiving sleeve 86 which extends through the cross section of the ring and is fixed thereto, such as by welding, this sleeve being axially aligned with strut 56 and housing 52.

The mount 8 can be attached to the bracket 58 and diaphragm 6 by inserting the free end of strut 56 through bushing 40 of the diaphragm and into the bracket, being held therein by the nut 62.

Ring 66 has a centrally located threaded bore accessible through the top plate 74, which is aligned with the sleeve 86 when the engine is in position in the nacelle. A threaded stud 88 is inserted through the sleeve and screwed into said bore forming a rigid connection. Details of a similar mount are disclosed in Tyler et al. Patent No. 2,477,501, issued July 26, 1949.

It is to be understood that the invention is not limited to the specific embodiment herein illustrated and described, but may be used in other ways without departure from its spirit as defined by the following claims.

I claim:

1. In combination, an engine having a diaphragm secured thereto, an engine support disposed in a plane normal to the axis of rotation of the engine, a plurality of mounts for connecting said engine to said support and means for connecting said diaphragm to said mounts for transmitting torsional loads from the engine to said mounts, said means including a hub on each mount and a bushing for each hub in said diaphragm for receiving said hubs.

2. An engine having a case in combination with supporting structure including a plurality of mounting units attached to and extending outwardly from said engine case, and a diaphragm secured to said case in axially spaced relation to the attachment of said units, said diaphragm extending outwardly from the engine and engaging the units, said diaphragm having openings therein through which the units extend and in which the units are piloted.

3. An engine having a case, in combination with a supporting member extending around said engine and having a wall structure adjacent thereto, a plurality of engine mounts extending from the engine case to the supporting member, and a diaphragm connected to said engine case and extending outwardly to engage said wall structure, said diaphragm extending at an angle to the axis of each mount and having openings therein in which the mounts are secured.

4. An engine mount structure for connecting a supporting structure to an engine having a case, said mount structure including an annular diaphragm connected at its inner edge to said case, a housing mounted in said diaphragm and having an extending strut adapted to be connected to the case at a point spaced from the diaphragm, a member located within said housing and having a projecting stud adapted to be attached to said supporting structure, and resilient means supporting said member within the housing.

5. An engine mount structure for connecting a supporting structure to an engine having a case, said mount structure including an annular diaphragm connected at its inner edge to said case, a housing having an extending strut adapted to be connected to the case at a point spaced from the diaphragm, a hub located on said strut, said diaphragm having a bushing mounted therein to receive each hub, a member located within said housing and having a projecting stud adapted to be attached to said supporting structure, and resilient means supporting said member within the housing.

6. An engine mount structure for connecting an engine having a crankcase to a supporting structure surrounding said crankcase, said mount structure including an annular diaphragm attached at its inner edge to said crankcase, said diaphragm extending radially outwardly from said crankcase, in combination with a number of individual mounts arranged around said crankcase in angularly spaced relation, each mount including a housing having a projecting strut, a member located within said housing having a projecting stud extending in substantially the opposite direction from said strut, and resilient means secured to said member and positioned between it and the housing to support the member resiliently within the housing, said studs being adapted to be attached to the supporting structure, and the struts being secured to the engine, said strut extending through the diaphragm, each housing having a hub which fits in a bushing in the diaphragm.

7. In combination, an engine, a cowling around said engine, a diaphragm fixed to said engine and extending radially therefrom, an engine support in said cowling, a wall structure extending between said cowling and said diaphragm and a plurality of mount units connecting said engine to said support and passing through said diaphragm, said mounts each having a hub, said diaphragm having a bushing for each hub to be mounted in.

8. An engine having a case, in combination with a supporting member extending around said engine and having a wall structure adjacent thereto, a plurality of engine mounts extending from the engine case to the supporting member, and a diaphragm connected to said engine case and extending outwardly to engage said wall structure, said diaphragm extending at an angle to the axis of each mount and having openings therein in which the mounts are secured, said wall structure having a substantially conical inner edge, and the diaphragm having a similar cooperating outer edge.

9. An engine mount structure for connecting an engine having a case to a supporting structure surrounding said case, said mount structure including an annular diaphragm attached at its inner edge to said case, said diaphragm extending radially outwardly from said case, in combination with a number of individual mounts arranged around said case in angularly spaced relation, each mount including a housing having a projecting strut, a member located within said housing having a projecting stud extending in substantially the opposite direction from said strut, and resilient means secured to said member and positioned between it and the housing to support the member resiliently within the housing, said studs being adapted to be attached to the supporting structure, and the struts being secured to the engine, each strut extending through an opening in said diaphragm and being piloted therein so that torque from said engine may be transmitted through said diaphragm.

10. In combination, an engine, an annular diaphragm, means for securing said annular diaphragm to said engine, an engine support, a plurality of mounting units, each mounting unit being connected to said engine at one end, each mounting unit being connected to said support at another end, and means for transmitting loads from the engine to said mounting units, said last named means including a connection between said annular diaphragm and each of said mounting units at a place intermediate the ends of each of said units.

11. In combination, an engine, an annular diaphragm, means for securing said annular diaphragm to said engine, an engine support, a plurality of mounting units, each of said mounting units including two members, resilient means located between said members, one member of each mounting unit being connected to said engine, the other member of each mounting unit being connected to said support, and means for transmitting loads from the engine to said mounting units, said last named means including a connection between said annular diaphragm and each of the members of each of said mounting units connected to said engine.

References Cited in the file of this patent

UNITED STATES PATENTS

| | | |
|---|---|---|
| 2,365,421 | Lord | Dec. 19, 1944 |
| 2,376,317 | Wallerstein | May 15, 1945 |
| 2,377,006 | Heinemann et al. | May 29, 1945 |
| 2,379,315 | Moorehead | June 26, 1945 |
| 2,477,501 | Tyler et al. | July 26, 1949 |